Aug. 23, 1938.    G. W. WOODS ET AL    2,128,111
WELDED TOOL JOINT
Original Filed Nov. 4, 1935

Gorham W. Woods
Henry B. Woods
INVENTORS

BY Jesse R. Stone
ATTORNEY

Patented Aug. 23, 1938

2,128,111

UNITED STATES PATENT OFFICE 2,128,111

WELDED TOOL JOINT

Gorham W. Woods and Henry B. Woods, Houston, Tex., assignors to Hughes Tool Company, Houston, Tex., a corporation of Texas Application November 4, 1935, Serial No. 48,194
Renewed July 26, 1937

7 Claims. (Cl. 285—146)

Our invention relates to tool joints ordinarily employed in rotary well drilling to connect together sections of drill stem.

It is customary to attach tool joints to the ends of the pipe sections by a threaded engagement which is subject to wear and leakage and is to that extent objectionable. Where these connections are welded the joint is still subject to breakage at the weld because of the form of the shoulder formed at the weld.

It is an object of our invention to attach the tool joint to the pipe by a type of weld construction which will be strong and leak-proof and adapted to undergo the usual lateral strains encountered in use.

It is further desired to form a weld which will not be liable to rapid corrosion and wear in use.

We also have as an object to form a wear shoulder at the lower end of the joint against which the elevators may engage in handling the drill stem.

A further object is to attach, at the weld, a steel ring so secured in position as to prevent the formation of an abrupt shoulder at the point where the pipe is joined to the coupling.

The main object is to provide a strong, well-formed weld which will not weaken the pipe at the joint and will prevent leakage.

Figure 1:
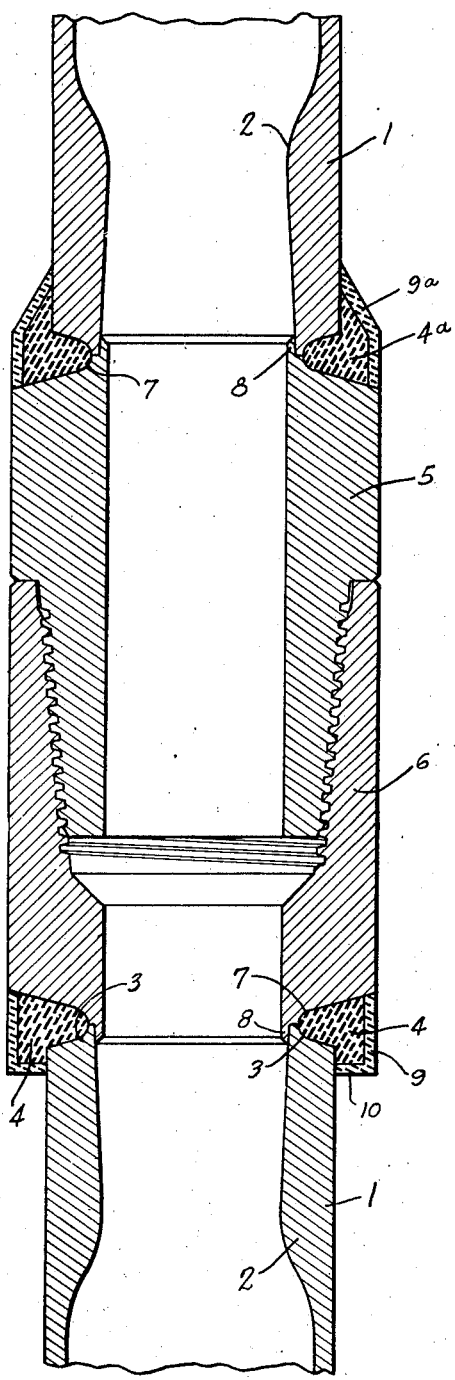

Referring to the drawing, Fig. 1 is a central longitudinal section through a tool joint attached to pipe sections by the use of our invention.

Figure 2:
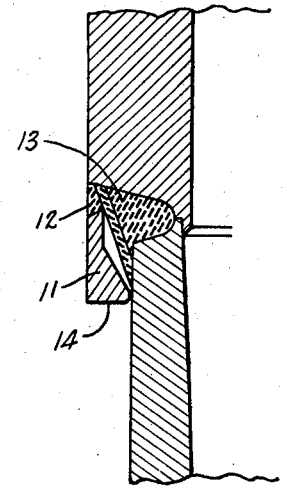

Fig. 2 is a broken sectional detail of a modification of the lower shoulder construction.

We have shown the drill stem sections 1 as upset internally at 2 to provide thick strong walls on the drill stem at the joint. The extreme ends are cut away slightly on the outer side at 3 to receive the weld metal 4.

Both the pin member 5 and the box member 6 have their pipe ends also cut away somewhat at 7 to receive the weld metal. There is a short extension 8 on the joint sections fitting slidably within the ends of the pipe sections.

The weld metal 4 between the lower end of the box section and the upper end of the pipe section is formed of steel and is built up to extend nearly to the outer diameter of the joint member. Outside the steel is a welded layer 9 of stainless steel which forms a hard protecting coat over the steel weld. This prevents corrosion and also withstands wear. The weld 4 extends down a short distance along the end of the pipe and a squared shoulder 10 is formed, spaced from the joint to receive the elevators. This shoulder is away from the juncture between the pipe and joint so that lateral strains due to flexing of the pipe in use will not tend to crack the joint.

At the upper end of the pin member the weld 4ª is formed with the added metal extending up along the pipe and tapered so that no abrupt shoulder is formed where fracture might take place. This weld is also protected by an outer layer of stainless steel 9ª.

The tool joint thus connected to the pipe ends becomes practically integral and is not liable to breakage at the weld due to the form of the weld and to the strengthening and protecting layer of stainless steel thereon.

The lower weld may be formed in the same manner as the upper weld if desired, as shown in Fig. 2. Such a tapered weld is desirable because it eliminates the formation of sharp shoulders where fracture may occur. To provide a hard shoulder to receive the elevators we then provide a steel ring 11, the upper end of which is beveled somewhat to receive a bond of welding material 12 by means of which it is attached to the upper end of the weld 13. This steel ring is recessed internally to space it slightly from the pipe, the lower end being reduced somewhat in internal diameter to loosely contact the pipe. Such a ring will not form an abrupt shoulder with the pipe where strains may be set up and will still furnish the tool engaging shoulder 14 desirable in the handling of the drill stem in use.

The particular form of this weld overcomes the objectionable features ordinarily encountered in welded joints and a structure in all practical respects as strong as an integral connection is obtained.

What we claim as new is:

1. A tool joint including an upper pin member and a lower box member adapted to interengage, pipe sections having upset ends for attachment with the remote ends of said members, the walls of said members being of greater thickness than those of said pipe section, weld receiving recesses in the adjacent ends of each pipe section and joint member, a bond of steel welded in said recesses and extended away from the joint along the pipe to avoid an abrupt shoulder at the pipe end, and an outer layer of hard stainless metal welded to and enclosing said steel bond.

2. A tool joint member having a threaded joint end and a recessed pipe end, a pipe section interfitting with said joint member at its pipe end, a bond of steel welded in said recessed pipe end and securing said member to said pipe, said welded bond being tapered away from the member along said pipe and means to form a hard shoulder at the lower end of said joint member, including a hard steel ring welded to said joint member at one end and extending freely along said welded bond outside said pipe.

3. A tool joint member, a pipe section, a flange on said joint member telescoping within said pipe section, the adjacent ends of said member and section being recessed toward their outer surfaces, a bond of steel welded in said recessed portion and extending away from the said ends along the pipe, a ring secured at its upper end to said weld and spaced from said pipe, and a lower shoulder on said ring.

4. A tool joint including a box member, a pipe section engaging at one end with said member, a bond of steel welded between the adjacent ends of said member and pipe section to secure them together, said bond of steel being squared off to form a lower shoulder, and a layer of corrosion resisting metal welded over the surface of said bond.

5. A tool joint member, a pipe section secured integrally thereto, the lower end of said tool joint member being thicker than said pipe section to form an exterior shoulder, a ring thereon decreasing in thickness from its lower toward its upper end, and a bond of welding material integrally securing the upper end of said ring to said shoulder.

6. A tool joint member, a drill stem section secured integrally thereto, an exterior shoulder on said member, a steel ring spaced from said pipe except at its lower end, and a bond of welding material securing said ring integrally to said shoulder.

7. A tool joint member, a drill stem section secured thereto, the end of said member secured to said stem section being of larger exterior diameter than said stem section so as to overhang the same and a steel ring spaced from the pipe except at its lower end, the upper end of said ring being secured to said member.

GORHAM W. WOODS.
HENRY B. WOODS.